(12) United States Patent
Bretaudeau

(10) Patent No.: US 10,949,992 B2
(45) Date of Patent: Mar. 16, 2021

(54) LOCALIZATION SYSTEM WITH A COOPERATIVE OPTRONIC BEACON

(71) Applicant: Francis Bretaudeau, Douville sur Andelle (FR)

(72) Inventor: Francis Bretaudeau, Douville sur Andelle (FR)

( * ) Notice: Subject to any disclaimer, the term of this patent is extended or adjusted under 35 U.S.C. 154(b) by 0 days.

(21) Appl. No.: 15/951,221

(22) Filed: Apr. 12, 2018

(65) Prior Publication Data

US 2019/0385335 A1    Dec. 19, 2019

(51) Int. Cl.
*G06T 7/73* (2017.01)
*G01S 17/66* (2006.01)

(52) U.S. Cl.
CPC ............... *G06T 7/73* (2017.01); *G01S 17/66* (2013.01); *G06T 2207/30204* (2013.01); *G06T 2207/30208* (2013.01); *G06T 2207/30244* (2013.01)

(58) Field of Classification Search
CPC . G01S 5/163; G01S 5/16; G01S 17/66; G01S 17/42; G01S 3/782; G01S 3/7835; G06T 7/70; G06T 2207/30244; G06T 7/73; G06T 7/74; G06T 2207/30204; G06T 2207/30208; G06F 3/0308; G06F 3/0325
See application file for complete search history.

(56) References Cited

U.S. PATENT DOCUMENTS

| | | | | |
|---|---|---|---|---|
| 7,230,689 B2 * | 6/2007 | Lau | ...................... | G01B 11/002 356/73 |
| 7,599,789 B2 * | 10/2009 | Leonard | ............... | G01C 21/005 382/103 |
| 8,625,108 B2 * | 1/2014 | Bresciani | ................ | G01S 17/06 356/614 |
| 8,724,104 B2 * | 5/2014 | Bresciani | ............. | B64G 1/1085 356/139.03 |
| 9,261,625 B2 * | 2/2016 | Larigani | ................... | G01V 7/04 |
| 9,402,070 B2 * | 7/2016 | Tohme | ................ | G06F 3/03545 |
| 9,602,811 B2 * | 3/2017 | Hillebrand | ........... | H04N 13/243 |
| 9,746,544 B2 * | 8/2017 | Deliwala | ................. | G01S 3/783 |
| 10,048,379 B2 * | 8/2018 | Markendorf | ............ | G01S 17/86 |
| 10,295,651 B2 * | 5/2019 | Ben-Tzvi | ............. | G01B 11/002 |
| 2010/0149525 A1 * | 6/2010 | Lau | ...................... | G01B 11/002 356/139.03 |
| 2012/0105821 A1 * | 5/2012 | Moser | ..................... | G01S 17/66 356/3.09 |

(Continued)

*Primary Examiner* — John Villecco
(74) *Attorney, Agent, or Firm* — Hauptman Ham, LLP

(57) ABSTRACT

The invention relates to a system which includes an observation device (14) including a camera (7) and a cooperative optronic beacon (13) providing all the necessary information to the observation device in order to localize it with a 6D coordinates (position and attitude); thus the invention provides a solution to the problem of a 6D localization of a camera using one single cooperative optronic beacon (13); thanks to the information provided by the cooperative optronic beacon (13), this allows the camera (7) of the observation device (14), by observing this cooperative optronic beacon (13) and by processing the corresponding information, to determine its own 6 localization coordinates in reference to this cooperative optronic beacon (13); so the system according to the invention is suited in particular for the localization of drones, robots, Smartphone, etc. in environments where presence of other localization services (GPS or others) are not available.

8 Claims, 1 Drawing Sheet

(56) References Cited

U.S. PATENT DOCUMENTS

| | | | |
|---|---|---|---|
| 2012/0262550 A1* | 10/2012 | Bridges | G01C 15/002 348/46 |
| 2016/0146600 A1* | 5/2016 | Taghavi Larigani | G01B 11/14 702/150 |
| 2016/0209248 A1* | 7/2016 | Hasler | G01D 5/36 |
| 2018/0038939 A1* | 2/2018 | Bruemmer | G01S 5/0289 |
| 2018/0089841 A1* | 3/2018 | Dai | G01P 15/18 |
| 2019/0004619 A1* | 1/2019 | Kahle | G01S 17/42 |
| 2019/0186907 A1* | 6/2019 | Lau | G01C 15/00 |

* cited by examiner

LOCALIZATION SYSTEM WITH A COOPERATIVE OPTRONIC BEACON

BACKGROUND OF THE INVENTION

1. Field of the Invention

The technical domain of the invention concerns the ability to localize in 6D a camera, or an equivalent optical device, in the space, from an optical marking realized with an optronic beacon. The 6D localization which is considered here concerns how to determine, in a zone linked to where the camera is, on one hand the position of the camera (as usual the 3 coordinates x, y, z) and on the other hand the attitude of the camera (the usual 3 Euler angles, or the attitude in terms of pitch, roll, yaw). On an academic point of view, this subject deals with the scientific domains of:

Determining what is the pose (6D localization) of a camera obtained from the images/pictures it captures;
Cooperative localization which deals with the ability to localize entities, by fusion of information captured by distributed cooperative "actors" of the system.

This is particularly useful in order to localize a drone in space, a robot, equipped with a camera or also the localization of people equipped with a Smartphone for example. In order for this localization to be efficient, it must be obtained with a number of beacons which should be as few as possible and this is the precise issue which is dealt with in this invention.

DESCRIPTION OF THE PRIOR ART

This invention comes after a full set of studies focused on how to use reflective optical beacons which have been described in the U.S. Pat. No. 4,642,469 (Three-dimensional reflectors for object attitude recognition) and French patents #FR2557375A1 and #FR2557307A1. These optical beacons operate a specific optical attribute which simply allows a camera which is observing these beacons to calculate the perpendicular to the support-flat face (the plane) of these, provided that at least two beacons are set on the same plane.

Concerning the above there are two main limits using these optical beacons:

1. The first limit comes from the fact that it is not easy to build big size beacons with a sufficient lighting strength in order to allow a long distance localization (several hundreds of feet);
2. The second limit is that being under the obligation to use two beacons at least in order to produce this 6D localization, 3 positions coordinates in the space (x, y, z) and 3 attitudes coordinates (3 Euler angles); this constraint might create a difficulty under some circumstances and it is interesting to be able to perform this technique with only one single beacon.

Nevertheless, there is is a very large amount of research within these academic domains, but the essential part, for cooperative localization and pose estimation, is focused on information fusion techniques and methods coming from the various "actors" of the system and not on the capability to determine a new optical principle using cooperative "actors", which is the essential strength of this invention. Concerning this topic of cooperative localization we can cite the following Thesis or Dissertation: "Cooperative Localization: On motion-induced initialization and joint state estimation under communication constraints." Written by Mr. Trawny dated August 2010, giving a good overview of the state of the art, technics and methods.

SUMMARY

The characteristics of the invention will provide a solution to both limits. The present invention dismisses the above limits by allowing an observation device, involving an observation camera, to localize itself in 6D (x, y, z and 3 Euler angles) in reference to a visualization device.

The visualization device products and delivers to the observation device all the required information which is necessary, for the observation device to be able to localize itself, using both information captured by the observation device and information coming from the visualization device. In order to get the system working to produce the 6D pose determination of the observation device to locate itself in reference to the visualization device, gathering of information computed by each device is required and for that purpose a communication of information between the two devices is necessary in order to perform it.

BRIEF DESCRIPTION OF THE DRAWINGS

The drawings which are enclosed show the invention:
picture 1 introduces the fundamental elements of the invention; the schematic presents all the components from a geometrical point of view;
picture 2 shows the most technical sides of the best mode of realization of the invention; the schematic presents the two devices of the system and the main components to clarify main relationships between sub-elements of both devices.

In the text here under we will use the following very simple formalism to describe an element of a picture: (fig. X/Y) in which X will refer to the picture's number and Y to the element number of the said picture, respecting the principle that any element that appears on different pictures will bear the same element number.

DETAILED DESCRIPTION

Figure 1:
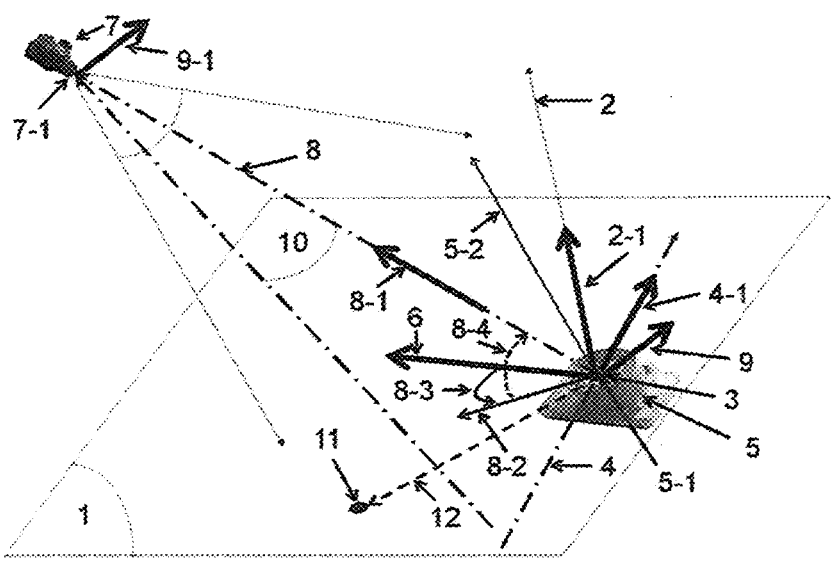

According to the invention, the observation device with a cooperating optronic beacon consists of the following elements:

As the first characteristic of the invention: an optronic beacon which is composed of the following two items:
A flat "visualization surface", rather rectangular, which owns a "principal-axis" which corresponds to the perpendicular of this flat visualization surface. This principal-axis will generally be placed at the center of this flat visualization surface, even though this is not necessary nor a specific requirement, nevertheless this position characterizes the center of the orthonormal coordinate system of the visualization surface, defined below as the "center of the visualization surface"; on this surface we can picture a segment of straight line which is orientated, for example with a few LEDs (light emitting diodes) correctly lined up and representing as such a code which allows to understand in which direction they are orientated, defined below as the "visualized-orientated-segment of straight line", this visualized-orientated-segment of straight line going through the center of the visualization surface; we define an orthonormal coordinate system which we associate to this visualization surface, the orthonormal coordinate system of the visualization device, whose center is the center of the visualization device and whose three axis are (i) the principal-axis, (ii) the visualized-orientated-segment of straight line and (iii) the straight line which is perpendicular to theses two previous other axis;

A direction sensor, like a standard camera, is firmly attached to the visualization surface and whose optical center of its lens is positioned on the principal-axis and coincides with the center of the visualization surface; this direction sensor, by information processing, allows it to determine in the orthonormal coordinate system of the visualization device the straight line passing through both the optical center of the direction sensor and the optical center of the observation camera. This straight line between both cameras which we will name "inter-cameras straight line" is thus known by both the visualization device and the observation device, and with this inter-cameras straight line, through a digital treatment on the visualization device side, we will be able to find the "visualized-plane" containing the optical center of the direction sensor, which is also the center of the visualization surface and which also contains i.) the "inter-cameras straight line" and ii.) the visualized-orientated-segment of straight line; by construction, this plane includes the optical center of the observation camera (since it belongs to the inter-cameras straight line); furthermore, this visualized-plane is also known by the observation camera since from its position it sees the inter-cameras straight line and the visualized-orientated-segment of straight line, these two elements characterizing the visualized-plane and it is then a plane which is known by both cameras. Regarding the visualization device we will determine what are, the "inter-cameras vector" which is the unitary vector of the inter-cameras straight line, the "visualized-perpendicular vector" which is the unitary vector perpendicular to the visualized-plane, and by construction this vector is perpendicular to the inter-cameras vector; from there we will determine by a relatively simple mathematical calculation the "visualized-complementary vector", perpendicular on the one hand to the inter-cameras vector and on the other hand perpendicular to the visualized-perpendicular vector; these three vectors characterize an orthonormal coordinate system, the "visualized-orthonormal coordinate system", associated to the visualized-plane; from there we are able to determine what is the "visualized-transition matrix", transition matrix between this visualized-orthonormal coordinate system and the orthonormal coordinate system of the visualization device; regarding the observation device, since we know the visualized-plane too we can find the visualized-plane orthonormal coordinate system in reference to the orthonormal coordinate system of the observation device, and if the observation device retrieves the visualized-transition matrix, it can also determine what is the orthonormal coordinate system of the visualization device in reference to the visualized-orthonormal coordinate system and consequently determine the orthonormal coordinate system of the visualization device in reference to the orthonormal coordinate system of the observation device; according to the invention the information regarding the visualized-transition matrix between the visualized-orthonormal coordinate system and the orthonormal coordinate system of the visualization device is the essential information that the visualization device delivers to the observation device with the help of a communication system between the two devices; the information concerning the visualized-transition matrix is either the matrix itself or the basic information allowing to calculate it and it is, among others, the inter-cameras vector and the visualized-perpendicular vector.

As the second characteristic of the invention, the visualization device owns a visualization-optical visual code which is linked to the direction sensor, whose physical construction allows, in the pictures obtained by the observation camera and by a digital treatment done at the level of the observation device, to find in the picture where the optical center of the direction sensor is and to deduct its direction which allows at the level of the observation camera to determine where the inter-cameras straight line is; this visualization-optical visual code allows to characterize at minima an orientated-straight line that the observation device recognizes and deducts the relative position of the optical center of the direction sensor; as this orientated-straight line is superimposed with the visualized-orientated-segment of straight line, its direction then defines the direction of the orientated-straight line;

As the third characteristic of the invention, a mean of communication allowing to deliver to the observation device the relevant information regarding the visualized-transition matrix, this can be achieved by at least two ways:

Either optically, by adding to the visualization device an optical equipment which can be programmed allowing to generate in real time the visualization-communication-optical code which can be like a barcode or binary code or any other system, for example with a matrix of LEDs that the observation camera will be able to recognize and interpret/understand through an image processing allowing the observation system to deduct directly, in images obtained in the observation camera, information regarding the visualized-transition matrix, represented by the visualization-communication-optical code that was programmed;

Or by wireless communication by adding a communication system as UHF, WIFI, GPRS, Bluetooth or any other between the visualization device and the observation device and allowing to transfer the relevant information regarding the visualized-transition matrix from the visualization device to the observation device, this communication being either attached to one of the two ends or shared;

As the fourth characteristic of the invention, a specific-point linked to the visualization device which is visually identifiable i.e. by image processing by the observation device; this specific point is useful at the level of the observation device, thanks to the knowledge of the visualized-transition matrix, to produce the 6D localization of the orthonormal coordinate system of the visualization device in reference to the orthonormal coordinate system of the observation device, or inversely, the 6D localization of the orthonormal coordinate system of the observation device in reference to the orthonormal coordinate system of the visualization device; this specific-point is thus useful to define the dimensions elements allowing to find what the position is, i.e. the 3 classical coordinates (x, y, z), of the center of the orthonormal coordinate system of the visualization device, and this within the orthonormal coordinate system linked to the camera of the observation device; in order to do this we only need to have one single specific-point known in the orthonormal coordinate system of the visualization device which will allow the observation camera to recognize it and to determine with a rather simple mathematical calculation the precise position of the center of the orthonormal coordinate system of the visualization device.

According to the invention we have an observation device including at least the observation camera or equivalent device, and this observation device owns the following characteristics:

As the fifth characteristic of the invention, an observation-visual optical code linked to the observation camera whose physical organization allows the direction sensor of the visualization device to easily locate the optical center of the observation camera belonging to the observation device and to further deduct where the inter-cameras straight line is, at the level of the visualization device;

As the sixth characteristic of the invention, a technical mean to retrieve the relevant information regarding the visualized-transition matrix delivered by the visualization device, it can be obtained:

Either with a wireless communication receiver allowing to receive information from the visualization device thanks to the reception of the corresponding emissions of the communication system;

Or by a digital processing of the images received by the observation camera, along with the proper identification of the visualization-communication-optical code displayed in real time by the visualization device.

As the seventh characteristic of the invention, a standard type observation camera or equivalent device allowing to observe the visualization device; the observation camera has an orthonormal coordinate system which has its center superimposed with the optical center of its lens and this orthonormal coordinate system defines the orthonormal coordinate system of the observation device, a natural orthonormal coordinate system composed of the optical axis of its lens and the two orthogonal axis, perpendicular to the optical axis, linked to the matrix of pixels of the observation camera; and by a digital processing of images captured by the observation camera, the observation device does the following:

Determine the inter-cameras straight line by identification, in the image captured by the observation camera the aiming direction of the optical center of the direction sensor of the visualization device; this is allowed by recognizing the code displayed by the visualization-optical visual code associated with the direction sensor according to what has been described in the second characteristic of the invention;

Determine the straight line, image of the visualized-orientated-segment of straight line which is displayed on the visualization surface of the visualization device, and from there to deduct the plane going through the optical center of the observation camera and through this straight line; this plane contains, according to the principle of the construction of an image, the visualized-orientated-segment of straight line itself as well as the inter-cameras straight line because the optical center of the direction sensor of the visualization device belongs to this visualized-orientated-segment of straight line; this plane is the visualized-plane;

Determine the visualized-orthonormal coordinate system which will thus be known in the orthonormal coordinate system of the observation device; it is built by the inter-cameras vector, unitary vector obtained directly from the inter-cameras-straight line, by the visualized-perpendicular vector which is the perpendicular unitary vector to the visualized-plane, and at last by the complementary-visualized-vector which is perpendicular to the other two vectors;

Determine the orthonormal coordinate system of the visualization device in reference to the orthonormal coordinate system of the observation device by using (i) the visualized-orthonormal coordinate system known in reference to the orthonormal coordinate system of the observation device and (ii) the visualized-transition matrix allowing to know the orthonormal coordinate system of the visualization device within the visualized-orthonormal coordinate system; since the visualized-orthonormal coordinate system is known in reference to the observation device, the orthonormal coordinate system of the visualization device will thus be determined in the orthonormal coordinate system of the observation device; the center of the orthonormal coordinate system of the visualization device is the optical center of the direction sensor of the visualization device, so it belongs to the inter-cameras straight line;

Determine the localization of the center of the orthonormal coordinate system of the visualization device within the orthonormal coordinate system associated to the observation camera; for this, knowing the orthonormal coordinate system of the visualization device within the orthonormal coordinate system of the observation device, we will find the precise position of the center of the orthonormal coordinate system of the visualization device with a rather simple mathematical calculation, using the specific-point according to the fourth characteristic of the invention, which is associated with the visualization device;

As the eighth characteristic of the invention, to determine the 6D localization of the observation device within the orthonormal coordinate system of the visualization device, this is easy to obtain it because on a mathematical point of view we can reverse the problem, i.e. knowing the orthonormal coordinate system of the visualization device within the orthonormal coordinate system of the observation camera of the observation device, with a rather simple mathematical calculation we can deduct mathematically the 6D localization of the observation camera within the orthonormal coordinate system of the visualization device.

BEST MODE OF REALIZATION

According to a best mode of realization of the invention, we have a visualization surface (FIG. 1/1) with its principal-axis (FIG. 1/2), perpendicular to the visualization surface; the intersection of this principal-axis (FIG. 1/2) with the visualization surface (FIG. 1/1) defines the center (FIG. 1/3)

of the orthonormal coordinate system of the visualization surface; on the visualization surface, we can see the visualized-orientated-segment of straight line (FIG. 1/4) thanks to, for example, a series of LEDs going through the center (FIG. 1/3) of the visualization surface; we add to the visualization surface (FIG. 1/1) a direction sensor (FIG. 1/5) whose optical center (FIG. 1/5-1) of the lens is superimposed with the center (FIG. 1/3) of the orthonormal coordinate system of the visualization surface; the optical axis (FIG. 1/5-2) of the direction sensor is not necessarily superimposed with the principal-axis (FIG. 1/2).

The visualization device owns its orthonormal coordinate system which is defined by three vectors, the unitary vector of the principal-axis (FIG. 1/2-1), the unitary vector of the visualized-orientated-segment of straight line (FIG. 1/4-1), the unitary vector (FIG. 1/6) of the straight line which is perpendicular to the two other vectors; the direction sensor and the orthonormal coordinate system of the visualization device owns the same center (FIG. 1/3) and (FIG. 1/5-1); knowing the rotation matrix between the orthonormal coordinate system of the direction sensor and the orthonormal coordinate system of the visualization device, we can determine, inside the visualization device, the coordinates of any vector known in the orthonormal coordinate system of the direction sensor.

Besides, we have an observation device which includes a camera (FIG. 1/7) with the optical center of its lens (FIG. 1/7-1); when determining the inter-cameras straight line (FIG. 1/8) by linking the two optical centers (FIG. 1/5-1) and (FIG. 1/7-1), by processing of the information gathered by the direction sensor (FIG. 1/5) of the visualization device, we are able to determine the coordinates of the unitary vector of the inter-cameras straight line, the inter-cameras vector (FIG. 1/8-1) in the orthonormal coordinate system of the visualization device.

The inter-cameras straight line (FIG. 1/8) and the visualized-orientated-segment of straight line (FIG. 1/4) constitute the visualized-plane (FIG. 1/10) which is known by the visualization device and by the observation camera (FIG. 1/7) of the observation device; at the level of the visualization device, we can determine the visualized-perpendicular vector (FIG. 1/9), vector perpendicular to the visualized-plane (FIG. 1/10), mathematically simply obtained thanks to the vector product between the unitary vector (FIG. 1/4-1) of the visualized-orientated-segment of straight line and the inter-cameras vector (FIG. 1/8-1); this visualized-perpendicular vector (FIG. 1/9) is also determined (FIG. 1/9-1) at the level of the observation camera (FIG. 1/7) thanks to the image of the visualized-orientated-segment of straight line (FIG. 1/4) which is included in the pictures that are obtained by the observation camera (FIG. 1/7); indeed, at the level of the observation camera (FIG. 1/7) the plane defined on one hand by the optical center of the lens (FIG. 1/7-1) of the observation camera (FIG. 1/7) and on the other hand by the visualized-orientated-segment of straight line (FIG. 1/4) or its image obtained at the level of the observation camera, is the visualized-plane (FIG. 1/10) and it contains by construction the inter-cameras straight line (FIG. 1/8).

The visualization device can then determine at its own level, the visualized-orthonormal coordinate system, the orthonormal coordinate system associated to the visualized-plane (FIG. 1/10) defined by:
 the inter-cameras vector (FIG. 1/8-1);
 the visualized-perpendicular vector (FIG. 1/9), which is perpendicular to the visualized-plane (FIG. 1/10);
 the visualized-complementary vector which simply results from the vector product of the two previous vectors.

The observation system can also determine, at its own level, the orthonormal coordinate system associated to the visualized-plane (FIG. 1/10), the visualized-orthonormal coordinate system, this orthonormal coordinate system being identical to the one which was determined at the level of the visualization device because it is constituted by the same set of basic vectors:
 the inter-cameras vector (FIG. 1/8-1);
 the visualized-perpendicular vector (FIG. 1/9-1) which is perpendicular to the visualized-plane (FIG. 1/10);
 the third vector which is a simple result of the vector product of the above two vectors, which is the visualized-complementary-vector.

Hence, we will have the same orthonormal coordinate system associated to the visualized-plane (FIG. 1/10) which will be known on one hand in the orthonormal coordinate system of the visualization device, and on the other hand in the orthonormal coordinate system of the observation camera belonging to the observation device (FIG. 1/7); it is this fundamental knowledge of the visualized-orthonormal coordinate system in both devices which will allow to determine the orthonormal coordinate system of the visualization device in reference to the orthonormal coordinate system of the observation device.

We will designate the following for the orthonormal coordinate system of the visualization device:
 $I_1$: the unitary vector (FIG. 1/4-1) of the visualized-orientated-segment of straight line;
 $I_2$: the unitary vector (FIG. 1/6) perpendicular to the vectors $I_1$ (FIGS. 1/4-1) and $I_3$ (FIG. 1/2-1) which is obtained by the vector product of these two vectors $I_1$ and $I_3$: we have $I_2 = I_3 \wedge I_1$ where $\wedge$ refers to the vector product between the two vectors $I_3$ and $I_1$ which are perpendicular between themselves;
 $I_3$: the unitary vector (FIG. 1/2-1) of the principal-axis; these three vectors ($I_1$, $I_2$, $I_3$) constitute the orthonormal coordinate system of the visualization device;
 $X_V$: any vector determined by its three coordinates ($z_1$, $z_2$, $z_3$) within the orthonormal coordinate system ($I_1$, $I_2$, $I_3$) of the visualization device, so we have $X_V = z_1*I_1 + z_2*I_2 + z_3*I_3$ Besides, we will have the orthonormal coordinate system of the visualized-orthonormal coordinate system, inducted by the inter-cameras straight line, built as follows:
 $U_1$: the inter-cameras vector (FIG. 1/8-1) which is a unitary vector;
 $U_2$: the visualized-perpendicular vector (FIG. 1/9) or (FIG. 1/9-1) which is a unitary vector;
 $U_3$: the third vector, perpendicular to the two vectors above, i.e. the visualized-complementary vector, which is a unitary vector; we have $U_3 = U_1 \wedge U_2$, where $\wedge$ means the vector product between the two vectors $U_1$ and $U_2$; as the vectors $U_1$ and $U_2$ are perpendicular one to the other, the vector $U_3$ being perpendicular to the two other vectors $U_1$ and $U_2$, the three vectors $U_1$, $U_2$ and $U_3$ constitute an orthonormal coordinate system, the one of the visualized-orthonormal coordinate system.
 X: any vector determined by its three coordinates ($x_1$, $x_2$, $x_3$) within the orthonormal coordinate system ($U_1$, $U_2$, $U_3$) of the visualized-orthonormal coordinate system; we have the following: $X = x_1*U_1 + x_2*U_2 + x_3*U_3$.

We will have, within the visualization device, the same equations regarding this coordinate base but whose vectors have known coordinates at the level of the visualization device; in order to acknowledge a vector belonging to the orthonormal coordinate system of the visualization device, we will add an index V, i.e. for the vector $U_1$ for example, we will designate by $U_{1V}$ the fact that its coordinates are defined in reference to the orthonormal coordinate system of the visualization device. Thus, we will have:

$U_{1V}$: the inter-cameras vector (FIG. 1/8-1) which is a unitary vector and which is known in the orthonormal coordinate system of the visualization device;

$U_{2V}$: the visualized-perpendicular vector (FIG. 1/9) which is a unitary vector and which is known in the orthonormal coordinate system of the visualization device;

$U_{3V}$: the visualized-complementary vector, perpendicular to the two vectors above and which is known in the orthonormal coordinate system of the visualization device; we have the following: $U_{3V}=U_{1V} \wedge U_{2V}$, where $\wedge$ means the vector product between the two vectors $U_{1V}$ and $U_{2V}$; as the vectors $U_{1V}$ and $U_{2V}$ are perpendicular one to the other, the vector $U_{3V}$ being perpendicular to the two other vectors $U_{1V}$ and $U_{2V}$, the three vectors $U_{1V}$, $U_{2V}$ and $U_{3V}$ constitute an orthonormal coordinate system;

X: any vector determined by its three coordinates ($x_1$, $x_2$, $x_3$) in reference to the orthonormal coordinate system ($U_1$, $U_2$, $U_3$), we will obtain its coordinates within this same orthonormal coordinate system ($U_{1V}$, $U_{2V}$, $U_{3V}$) known in reference to the visualization device; and we have the following: $X_V=x_1*U_{1V}+x_2*U_{2V}+x_3*U_{3V}$ Since we know this vector within the orthonormal coordinate system of the visualization device ($I_1$, $I_2$, $I_3$), we have:

$X_V=x_1*U_{1V}+x_2*U_{2V}+x_3*U_{3V}=z_1*I_1+z_2*I_2+z_3*I_3$

We will designate by $R_V$ the 3×3 matrix obtained from the vectors of the orthonormal coordinate system ($U_{1V}$, $U_{2V}$, $U_{3V}$), and $R_V=[U_{1V}, U_{2V}, U_{3V}]$, as $R_i$ the 3×3 matrix obtained from the vectors of the orthonormal coordinate system ($I_1$, $I_2$, $I_3$) and $R_i=[I_1, I_2, I_3]$; we will designate by [X] the vector whose coordinates are ($x_1$, $x_2$, $x_3$), and by $[X_i]$ the vector whose coordinates are ($z_1$, $z_2$, $z_3$);

We obtain the following matrix equation: $R_V*[X]=R_i*[X_i]$, which allows to determine the vector [X] knowing the vector [X], i.e.: $[X]=R_V^{-1}*R_i*[X_i]$, where $R_V^{-1}$ is the reverse matrix of $R_V$; the coordinate base ($I_1$, $I_2$, $I_3$) being the orthonormal coordinate system, we have $I_1=(1,0,0)$, $I_2=(0,1,0)$, $I_3=(0,0,1)$ and the matrix $R_1$ is thus the identity matrix, which simply leads to: $[X]=R_V^{-1}*[X_i]$; thus we obtain the coordinates of vector X in reference to the orthonormal coordinate system ($U_{1V}$, $U_{2V}$, $U_{3V}$), knowing the coordinates of this vector in the orthonormal coordinate system ($I_1$, $I_2$, $I_3$).

We will have, at the level of the observation device, the same equations but whose vectors have their coordinates known by the observation device; in order to designate the knowledge of a vector in the orthonormal coordinate system of the observation device, we will add an "0" index, i.e. for vector $U_1$, for example, we will designate with $U_{10}$ the fact that its coordinates are given in the orthonormal coordinate system of the observation device.

Thus, we will have:

the inter-cameras vector (FIG. 1/8-1) which is a unitary vector and known in the orthonormal coordinate system of the observation device;

$U_{20}$: the visualized-perpendicular vector (FIG. 1/9-1) which is a unitary vector and known in the orthonormal coordinate system of the observation device;

$U_{30}$: the visualized-complementary vector, perpendicular to the above two vectors, which is unitary and known in the orthonormal coordinate system of the observation device; we have $U_{30}=U_{10} \wedge U_{20}$, where $\wedge$ designates the vector product between the two vectors $U_{10}$ and $U_{20}$; since these two vectors are perpendicular one another, the vector $U_{30}$ being perpendicular to the two other ones $U_{10}$ and $U_{20}$, the three vectors $U_{10}$, $U_{20}$ and $U_{30}$ constitute an orthonormal coordinate base;

X: any vector, determined by its three coordinates ($x_1$, $x_2$, $x_3$) in reference to the orthonormal coordinate base ($U_1$, $U_2$, $U_3$), we will have the determination of its coordinates in reference to this same orthonormal coordinate system ($U_{10}$, $U_{20}$, $U_{30}$) known in reference to the observation device; we have: $X_0=x_1*U_{10}+x_2*U_{20}+X_3*U_{30}$, This will allow to determine the coordinates of a vector X in the coordinate base ($U_{10}$, $U_{20}$, $U_{30}$) from the knowledge of its coordinates in reference to the orthonormal coordinate base ($I_1$, $I_2$, $I_3$):

We will designate with $R_0$: the 3×3 matrix obtained from the vectors of the orthonormal coordinate base ($U_{10}$, $U_{20}$, $U_{30}$): $R_0=[U_{10}, U_{20}, U_{30}]$ and the coordinates of the vector X in this orthonormal coordinate system are given by: $[X_0]=R_0*[X]$;

Besides, we have: $[X]=R_V^{-1}[X_i]$, which allows to deduct:

$[X_0]=R_0*R_V^{-1}*[X_i]$ which gives directly the coordinates: $[X_0]$ of the vector X in the orthonormal coordinate system ($U_{10}$, $U_{20}$, $U_{30}$) from the coordinates $[X_i]$ of this same vector X known in the orthonormal coordinate system ($I_1$, $I_2$, $I_3$) of the visualization device.

This shows that at the level of the observation device, we will be able to determine the coordinates of a vector known in reference to the visualization device, provided that we have, at the level of the observation device, the visualized-transition matrix $R_V$ built from the coordinate base of the vectors ($U_{1V}$, $U_{2V}$, $U_{3V}$) known at the level of the visualization device.

We will designate the matrix $R_p=R_0*R_V^{-1}$ by the three vectors which constitute it: $R_p=[Y_1, Y_2, Y_3]$; in this frame and by construction, the vector $Y_1$ designates the coordinates of the vector $I_1$ in reference to the observation device, the vector $Y_2$ designates the coordinates of the vector $I_2$ in reference to the observation device, the vector $Y_3$ designates the coordinates of the vector $I_3$ in reference to the observation device; the vector $I_3$ being the perpendicular to the plane of the visualization surface and corresponds with the unitary vector (FIG. 1/2-1) of the principal-axis (FIG. 1/2), the vector $Y_3$ will thus designate the coordinates of this vector, the principal-axis, perpendicular at the visualization surface, known in the orthonormal coordinate system of the observation device. We will simply set: $R_p=[110, 120, 130]$ a 3×3 matrix where $I_{10}$ designates the vector $I_1$, known in the orthonormal coordinate system of the observation device, $I_{20}$ designates the vector $I_2$ known in the orthonormal coordinate system of the observation device, $I_{30}$ designates the vector $I_3$ known in the orthonormal coordinate system of the observation device.

At this level, we know the transition matrix $R_p$ between the orthonormal coordinate system of the visualization device and the orthonormal coordinate system of the observation device, but we do not know what is the position of the center of the orthonormal coordinate system—(FIG. 1/5-1)

or (FIG. 1/3)—of the visualization surface in reference to the center of the observation device, whose center of the orthonormal coordinate system is the optical center (FIG. 1/7-1) of the lens of the observation camera (FIG. 1/7).

We will designate with $M_1$ the center of the orthonormal coordinate system of the visualization device—(FIG. 1/5-1) or (FIG. 1/3)—and with $M_2$ (FIG. 1/11) the specific-point according to the fourth characteristic of the invention. The vector $W=M_1 M_2$ (FIG. 1/12) is known in the orthonormal coordinate system $(I_1, I_2, I_3)$ of the visualization device; we have:

$W=M_1 M_2 = a_1*I_1 + a_2*I_2 + a_3*I_3$ where $a_1$, $a_2$ and $a_3$ are the three actual known coordinates of this vector in the orthonormal coordinate system $(I_1, I_2, I_3)$ of the visualization device; the coordinates of this vector W in the orthonormal coordinate system of the observation device are given by: $W=M_1 M_2 = a_1*I_{10} + a_2*I_{20} + a_3*I_{30}$, i.e. $W=R_P*[A]$ where $[A]$ is the vector of coordinates $[A]=(a_1, a_2, a_3)$;

Besides, we have C which designates the optical center (FIG. 1/7-1) of the observation camera (FIG. 1/7):
a. $CM_1 = k_1*V_1$ where $k_1$ is an unknown real number and $V_1$ the direction which is provided by observation camera (aiming direction of the point $M_1$), and it is precisely the value of this number $k_1$ that we must find in order to know the coordinates of the point $M_1$ (FIG. 1/3) in the orthonormal coordinate system of the observation camera (FIG. 1/7);
b. $CM_2 = k_2*V_2$ where $k_2$ is an unknown real number and $V_2$ the direction which is provided by observation camera (aiming direction of the point $M_2$), From there we deduct the equation we obtained in the orthonormal coordinate system of the observation device:
$W=M_1 M_2 = a_1*I_{10} + a_2*I_{20} + a_3*I_{30} = CM_2 - CM_1 = k_2*V_2 - k_1*V_1$ since we are in a three dimensional space, this vector equation provides three equations with two unknowns which are the coefficient $k_1$ et $k_2$; it is thus a simple problem to solve which gives a unique solution to the least squares method, as follows:

We have $R_P=[110, 120, 130]$ the 3×3 matrix composed in columns of the vectors 110, 120, 130;
We set $Q=[-V_1, V_2]$ the 3×2 matrix composed in columns of the vectors—$V_1$ and $V_2$;
We have the known vector $[A]=(a_1, a_2, a_3)$
We still need to find the unknown vector $[K]=(k_1, k_2)$;
The global matrix equation to solve is: $R_p*[A]=Q*[K]$; the classical result with the least squares method is: $[K]=(Q^T*Q)^{-1}, Q^T*R_p*[A]$ which provides then the vector K; in this solution, we have:
$Q^T$ which is the transposed matrix of the matrix Q thus of a 2×3 dimension;
$(Q^T*Q)^{-1}$ which is the reverse matrix of matrix $Q^T*Q$ which is of a 2×2 dimension because resulting from a matrix product $(Q^T)$ 2×3 with a matrix (Q) 3×2;
So we obtain the $k_1$ and $k_2$ coefficients because $[K]=(k_1, k_2)$ and we can immediately deduct vectors $CM_1=k_1*V_1$ and $CM_2=k_2*V_2$.

We have thus determined the coordinates of the point $M_1$ in the orthonormal coordinate system of the observation camera (FIG. 1/7) so we have all the necessary information regarding the orthonormal coordinate system of the visualization device $(M_1, I_1, I_2, I_3)$ in the orthonormal coordinate system of the observation camera (FIG. 1/7). From there, it is easy to determine the coordinates of the position of the optical center (FIG. 1/7-1) of the observation camera (FIG. 1/7) in reference to the orthonormal coordinate system of the visualization device because these equations are reversible; we know the vector $CM_1$ in the orthonormal coordinate system of the observation camera (FIG. 1/7), we only need to express its coordinates in the orthonormal coordinate system of the visualization device; we will then obtain:

a. $M_1 C = -k_1*V_1 = c_1*I_{10} + c_2*I_{20} + c_3*I_{30}$, where $c_1$, $c_2$ and $c_3$ are the three unknowns real coordinates of the point C (FIG. 1/7-1), optical center of the observation camera (FIG. 1/7), in reference to the orthonormal coordinate system $(I_1, I_2, I_3)$ known at the level of the orthonormal coordinate system of the observation device;
b. By designating with $[C]=(c_1, c_2, c_3)$ the vector containing the coordinates of vector KC in the orthonormal coordinate system $(I_1, I_2, I_3)$, and when we re-use the matrix expression with the matrix $R_P=[I_{10}, I_{20}, I_{30}]$ we obtain the matrix equation: $R_P*[C]=-k_1*V_1$; we then immediately deduct the unknown vector $[C]$ by a matrix inversion: $[C]=-k_1*R_P^{-1}*V_1$ where $R_P^{-1}$ is the reverse matrix of matrix $R_P$.

At this level we have solved the whole localization issue for the observation camera (FIG. 1/7) in reference to the orthonormal coordinate system of the visualization device thanks to:
The knowledge of the visualized-transition matrix $R_V$;
The knowledge of a specific point $M_2$ (FIG. 1/11) known in the orthonormal coordinate system of the visualization device.

To make this presentation complete, we will see that the visualized-transition matrix $R_V$ only depends on two parameters; the communication of this matrix, from the visualization device towards the observation device may then be summarized to the communication of only two parameters.

In order to do this, we will consider the inter-cameras vector (FIG. 1/8-1), unitary vector of the inter-cameras straight line, in polar coordinates; in order to do so we consider the vector (FIG. 1/8-2) projection of the inter-cameras vector (FIG. 1/8-1) on the plane which is defined by the visualization surface (FIG. 1/1); we then will be looking at the two following angles:
Angle $G_1$ (FIG. 1/8-3) in the visualization surface (FIG. 1/1) between the vector (FIG. 1/8-2) and the vector (FIG. 1/6) of the orthonormal coordinate system of the visualization device;
Angle $G_2$ (FIG. 1/8-4) between the vector (FIG. 1/8-2) and the inter-cameras vector (FIG. 1/8-1);
Knowing these two angles, the inter-cameras vector $U_{1V}$ which is defined in the orthonormal coordinate system of the visualization device has the following coordinates:

$$U_{1V}=(-\cos(G_2)*\sin(G_1), \cos(G_2)*\cos(G_1), \sin(G_2))$$

The vector $U_{2V}$, the visualized perpendicular vector (FIG. 1/9) which is unitary and perpendicular to the visualized plane formed by the two vectors, the inter-cameras vector $U_{1V}$ (FIG. 1/8-1) and the vector $I_1$ unitary vector (FIG. 1/4-1) of the visualized-orientated-segment of straight line, is determined by the vector product of these two vectors, we thus have $U_{2V}=I_1 \wedge U_{1V}$, the coordinates of $I_1$ are $I_1=(1, 0, 0)$; the visualized-perpendicular vector $U_{2V}$ defined in the orthonormal coordinate system of the visualization device has its coordinates as:

$$U_{2V}=(0,-\sin(G_2), \cos(G_2)*\cos(G_1)).$$

The vector $U_{3V}$, perpendicular vector (FIG. 1/9) to the two former vectors is determined by: $U_{3V}=U_{1V} \wedge U_{2V}$; we then have, as coordinates of this vector in the orthonormal coordinate system of the visualization device:

$U_{3V}=(\cos^2(G_2)*\cos^2(G_1)+\sin^2(G_2), \cos^2(G_2)*\cos(G_1)\\*\sin(G_1), \cos(G_2)*\sin(G_1)*\sin(G_2));$ The matrix $R_V=[U_{1V}, U_{2V}, U_{3V}]$ is constructed in columns by the three above vectors. This shows then that the knowledge of the two angles $G_1$ and $G_2$ is sufficient to determine the matrix $R_V$, all there is to do is communicate these two angles to the observation device so the latter can calculate the matrix $R_V$. In order to communicate these two angles' information, we can do that by optically displaying their information with a binary code through real time programmable LEDs, binary code associated with these angles; if we want to have a $1/1000$ resolution we can visualize the binary value of these angles with a set of 10 LEDs having two statutes, value 1 for being turned "on" and value zero for being turned "off"; with 10 LEDs the code can vary from 1 to 1023, which corresponds to the precision we are searching, of $1/1000$.

At this point, an important remark is necessary: the important point of the invention is to be able to calculate the transition matrix $R_P=R_0*R_V^{-1}$ between the orthonormal coordinate system of the visualization device and the orthonormal coordinate system of the observation device; this matrix is constructed on one hand from the matrix $R_V$ which is determined by the information only obtained by the visualization device, and on another hand from the matrix $R_0$ which is determined by the information only obtained by the observation device; according to the needs and the communication means which are available between these two devices, we can calculate the matrix $R_P$ at the level of the observation device as described here above, but we can also calculate this matrix at the level of the visualization device, as well as with a calculus mean which is independent from these two devices, able to receive these two matrix $R_0$ and $R_V$ or receiving information allowing to determine them.

Figure 2:
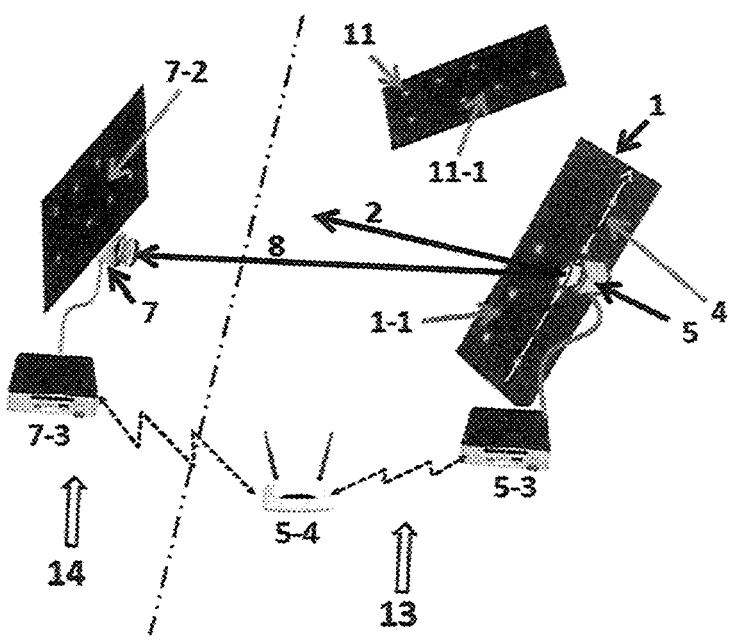

In order to complete the description of the system which is the matter of the invention, we will add in the realization mode which is presented:

To the observation camera (FIG. 1/7) a observation-optical visual code which can be identified by the direction sensor (FIG. 1/5); the device which will result from this will be named observation device further down in this text;

To the visualization device a visualization-optical visual code which can be identified by the observation camera (FIG. 1/7);

According to the most detailed mode of realization of the invention, we have then the following two devices (FIG. 2):
1. A visualization device (FIG. 2/13);
2. An observation device (FIG. 2/14); According to the invention, the visualization device (FIG. 2/13) includes:
   i. According to the first characteristic of the invention, a visualization surface (FIG. 2/1) which has a principal-axis (FIG. 2/2) which is perpendicular to the plane front face of the visualization surface (FIG. 2/1); the intersection between this principal-axis (FIG. 2/2) and the front face of the visualization surface (FIG. 2/1) defines the center of the visualization surface;
   ii. According to the first characteristic of the invention, a direction sensor (FIG. 2/5) like a camera, whose optical center, point through which travel all the rays useful to create the image, is superimposed with the center of the visualization surface;
   iii. According to the first characteristic of the invention, a visualized-orientated-segment of straight line (FIG. 2/4) containing the optical center of the direction sensor (FIG. 2/5);
   iv. According to the fifth characteristic of the invention, the direction sensor (FIG. 2/5) knows how to identify the optical center of the observation camera (FIG. 2/7) of the observation device (FIG. 2/14) thanks to the set (FIG. 2/7-2) of sources of light (LEDs) which has the specific characteristics allowing it to be identified by the direction sensor (FIG. 2/5) of the visualization device (FIG. 2/13).
   v. According to the second characteristic of the invention, we associate to the direction sensor (FIG. 2/5) a set of various sources of light (FIG. 2/1-1) having specific characteristics allowing it to be identified by the camera (FIG. 2/7) of the observation device (FIG. 2/14) and being used to locate the optical center of the direction sensor (FIG. 2/5) of the visualization device (FIG. 2/13); by specific characteristics we mean the fact that the setup of these sources of light may be identified with an important probability of being recognized; this can be obtained by displaying and organizing physically the sources of light (FIG. 2/1-1) according to a performing visualization-optical visual code;
   vi. According to the first characteristic of the invention, in order to do the digital processing, we will have, at the level of the visualization device (FIG. 2/13) a digital treatment of information equipment (FIG. 2/5-3), as a calculator, allowing to process in real time the information that are captured by the direction sensor (FIG. 2/5) in order to determine:
      The inter-cameras straight line (FIG. 2/8) linking the optical center of the direction sensor (FIG. 2/5) to the optical center of the observation camera (FIG. 2/7) of the observation device (FIG. 2/14);
      The visualized plane defined by the inter-cameras straight line (FIG. 2/8) and by the visualized-orientated-segment of straight line (FIG. 2/4);
      The visualized-transition matrix associated to the visualized-plane and to the inter-cameras straight line, or the two angles $G_1$ and $G_2$ allowing to calculate this visualized-transition matrix;
   vii. According to the fourth characteristic of the invention, a set of sources of light (FIG. 2/11-1) which can be identified by the observation device (FIG. 2/14) in which we define a specific-point (FIG. 2/11), the point $M_2$, corresponding to the specific-point presented and detailed here above;
   viii. According to the third characteristic of the invention, a wireless communication mean (FIG. 2/5-4) associated to the calculator (FIG. 2/5-3) allowing to transmit information regarding the visualized-transition matrix; we will use in this realization mode a standard wireless communication system; we can replace this wireless communication by a visualization-communication-optical code with real time programmable LEDs for example, allowing to visualize the binary code of the angles $G_1$ and $G_2$ which are sufficient to determine the visualized-transition matrix;

According to the invention, the observation device (FIG. 2/14) includes:
   I. According to the seventh characteristic of the invention, an observation camera (FIG. 2/7), able to capture the information produced by the visualization device (FIG. 2/13);

II. According to the fifth characteristic of the invention a set of various sources of light (FIG. 2/7-2) having specific characteristics allowing it to be identified by the visualization device (FIG. 2/13), and in particular allowing to locate the optical center of the observation camera (FIG. 2/7) of the observation device (FIG. 2/14); by specific characteristics we mean the fact that this set of sources of light can be identified with a high probability of recognition; this can be obtained by organizing physically the sources of light in respect of an observation-optical visual code; another way to proceed is to have sources of lights of which we can module the intensity according to a particular sequence, and this is specifically adapted to the usage, as a direction sensor (FIG. 2/5) at the level of the visualization device (FIG. 2/13) of a four quadrants detector with synchronous detection techniques;

III. According to the sixth characteristic of the invention, a wireless communication reception device allowing to receive the information emitted by the wireless system (FIG. 2/5-4) of the visualization device (FIG. 2/13); the digital treatment mean (FIG. 2/7-3) of the observation device (FIG. 2/14) will then receive the information of the visualized-transition matrix;

IV. According to the seventh characteristic of the invention, in order to process digital treatments, we will have, at the level of the observation device (FIG. 2/14) a digital treatment of information equipment (FIG. 2/7-3), as a calculator, allowing processing of images obtained by the observation camera (FIG. 2/7) in order to process in real time the information produced by the visualization device (FIG. 2/13); this allows, for the observation device (FIG. 2/14):

a. To identify the visualization-optical visual code which is visualized by the set of sources of light (FIG. 2/1-1) of the visualization device (FIG. 2/13), allowing then to deduct, through a geometrical spotting, the position, in the image which is obtained, of the optical center of the direction sensor (FIG. 2/5) of the visualization device (FIG. 2/13) and from there to determine the inter-cameras straight line (FIG. 2/8);

b. To identify, on the visualization surface (FIG. 2/1), the luminous information of the visualized-orientated-segment of straight line (FIG. 2/4) and thus to determine the visualized-plane formed by optical center of the observation camera (FIG. 2/7) and by the image, at the level of the observation camera (FIG. 2/7) of the visualized-orientated-segment of straight line (FIG. 2/4); according to what has been exposed and detailed here above, this visualized-plane contains the inter-cameras straight line (FIG. 2/8);

c. To gather the information of the visualized-transition matrix through messages which are sent in this objective thanks to the communication mean (FIG. 2/5-4) and sent to the corresponding receiver linked to the calculator (FIG. 2/7-3);

d. To determine the matrix which allows changing from the orthonormal coordinate system of the visualization device (FIG. 2/13) to the orthonormal coordinate system of the observation device (FIG. 2/14) by using on one hand the visualized-orthonormal coordinate system known in the orthonormal coordinate system of the observation device and on the other hand the visualized-transition matrix which is determined at the level of the visualization device and allowing determining the orthonormal coordinate system of the visualization device in reference to the visualized-orthonormal coordinate system;

e. To determine the precise position of the visualization device (FIG. 2/13) by identifying in the image the code which is associated to the set of sources of light (FIG. 2/11-1), allowing then identification of the point $M_2$ (FIG. 2/11) according to the fourth characteristic of the invention, used for the calculation of the said position using the method which has been exposed and detailed here above;

f. According to the eighth characteristic of the invention, to determine the 6D localization of the observation device (FIG. 2/14) in reference to the orthonormal coordinate system of the visualization device (FIG. 2/13) by the mathematical inversion of the localization formulas of the orthonormal coordinate system of the visualization device (FIG. 2/13) given in reference to the the orthonormal coordinate system of the observation device (FIG. 2/14);

According to the invention, this optical localization system with a cooperative optronic beacon constituted as such with these two devices of visualization and observation allows to localize in 6D, position (3D) and attitude (3D), the orthonormal coordinate system of the visualization device (FIG. 2/13) within the orthonormal coordinate system of the observation device (FIG. 2/14) and reciprocally, as it has been described here above. This works with implementation of only one single visualization device (FIG. 2/13).

The system, according to the invention i.e. an optical localization system with a cooperative optronic beacon is more specifically destined, in terms of industrial applications, for the localization of robots or drones or Smartphone, etc. in areas where there is no presence of localization capabilities such as GPS services; this localization system can allow drones or robots to perform automatic operations as for example, for drones, automatized inventories, sites observation, etc. We can add to this that, even if for example, the direction sensor (FIG. 2/5) is not exactly placed at the center of the visualization device, provided that the direction of the orientated-visualized-segment of straight line (FIG. 2/4) is correctly used for the orthonormal coordinate system, then, although being a little less precise, the system will still work properly and efficiently.

The invention claimed is:

1. A localization system including a cooperative optronic beacon, an observation device, and a communication system configured to exchange information between the cooperative optronic beacon and the observation device, said cooperative optronic beacon including a visualization device, the visualization device including a surface of visualization on which is disposed a visualized-orientated-segment of straight line, the surface of visualization having a visualization center, an orthonormal coordinate system whose center is the visualization center, the orthonormal coordinate system having 3 axis, a first axis being perpendicular to the surface of visualization, a second axis which is the visualized-orientated-segment of straight line disposed on the surface of visualization, a third axis being perpendicular to the 2 previous axis, a direction sensor whose optical center is superimposed with the visualization center of the surface of visualization, a first visual identification code defined by a set of specific points which is used for recognition and identification by the observation device of the set of specific points allowing thus the determination of the direction of the optical center of the direction sensor of the visualization device, said direction being an inter-cameras straight line viewed from the observation device, the observation device including an observation camera having an observation optical center, a second visual identification code for recognition and identification by the visualization device, the second visual identification code allowing the determination of the direction of the optical center of the observation camera of the observation device by the visualization device, said direction being the inter-cameras straight line viewed from the visualization device, wherein the knowledge by the visualization device of the inter-cameras straight line and of the visualized-orientated-segment of straight line allows the visualization device to deduct a visualized-plane as well as a visualized-transition matrix built from an unitary inter-cameras vector associated to said inter-cameras straight line and from an unitary visualized vector associated to the visualized-orientated-segment of straight line, said visualized-transition matrix allowing to determine an orthonormal coordinate system of the visualized-plane in reference to the orthonormal coordinate system of the visualization device.

2. The localization system according to claim 1, wherein the observation device has a natural orthonormal coordinate system attached to its observation camera defined by the observation optical center of the observation camera, by an natural optical axis and by a main axis attached to a matrix of sensors of the observation camera, said observation camera capture a flow of images allowing to determine the inter-cameras straight line and with an image of the visualized-orientated-segment of straight line the observation device determine the visualized-plane and to deduct from it an observation transition matrix, built from the unitary inter-cameras vector and an unitary perpendicular vector of the visualized-plane, said observation transition matrix between the orthonormal coordinate system of the visualized-plane and the natural orthonormal coordinate system of the observation device, said localization system producing the visualized-transition matrix for determination of the orthonormal coordinate system of the visualized-plane in reference to the orthonormal coordinate system of the visualization device, and the observation transition matrix between the orthonormal coordinate system of the visualized-plane and the natural orthonormal coordinate system of the observation device.

3. The localization system according to claim 2, wherein a global transition matrix between the orthonormal coordinate system of the visualization device and the natural orthonormal coordinate system of the observation device is obtained by a matrix multiplication of the observation transition matrix of the orthonormal coordinate system of the visualized-plane in reference to the natural orthonormal coordinate system of the observation device, by the reverse of the visualized-transition matrix of the orthonormal coordinate system of the visualized-plane in reference to the orthonormal coordinate system of the visualization device.

4. The localization system according to claim 1, wherein the visualization device owns at least a third visual code allowing the observation device to identify, in the flow of images obtained by the observation camera, at least a specific point belonging to the third visual code, and wherein the third visual code and the first visual code are complementary.

5. The localization system according to claim 4, wherein a position of the visualization center of the orthonormal coordinate system of the visualization device, in reference to the observation device, is determined by using a global transition matrix between the visualization device and the observation device and on the other hand the specific point belonging to the third visual code known in the orthonormal coordinate system of the visualization device; the information regarding the position of the visualization center of the orthonormal coordinate system of the visualization device and on the other hand the global transition matrix between the orthonormal coordinate system of the visualization device and a natural orthonormal coordinate system of the observation device constitute a 6D localization of the visualization device in reference to the observation device.

6. The localization system according to claim 5, further comprising a processor configured to process the information obtained on both the visualization device and the observation device, this allowing to determine the 6D localization of the visualization device in reference to the observation device and vice versa the 6D localization of the observation device in reference to the visualization device.

7. The localization system according to claim 6, wherein the processor is a calculator.

8. The localization system according to claim 1, wherein the communication system can be a wireless communication system or a set of programmable LEDs, allowing to deliver the information of the visualized-transition matrix from the cooperative optronic beacon to the observation device, it is either the visualized-transition matrix itself or angles which are necessary to build the visualized-transition matrix, and the communication system, as a wireless communication system, may be nevertheless attached to any of both devices, or shared by them.

* * * * *